United States Patent [19]

Wiser-Halladay et al.

[11] Patent Number: 5,048,608

[45] Date of Patent: Sep. 17, 1991

[54] CONSOLIDATION OF HYDRAULIC FRACTURES EMPLOYING A POLYURETHANE RESIN

[75] Inventors: Robin Wiser-Halladay, McKinney; Durai N. Raghavan, Plano, both of Tex.

[73] Assignee: Atlantic Richfield Company, Los Angeles, Calif.

[21] Appl. No.: 410,859

[22] Filed: Sep. 22, 1989

Related U.S. Application Data

[63] Continuation-in-part of Ser. No. 304,314, Jan. 31, 1989, abandoned.

[51] Int. Cl.$^5$ .................... E21B 43/04; E21B 43/267
[52] U.S. Cl. .................... 166/276; 166/280; 166/281; 166/295; 428/407; 523/131
[58] Field of Search ............ 166/276, 280, 281, 295, 166/308; 523/130, 131; 428/407; 528/59

[56] References Cited

U.S. PATENT DOCUMENTS

| | | | |
|---|---|---|---|
| 3,851,479 | 12/1974 | Argabright et al. | 166/295 |
| 3,878,686 | 4/1975 | Hageman et al. | 166/295 |
| 3,976,135 | 8/1976 | Anderson | 166/276 |
| 4,113,014 | 9/1978 | Kubens et al. | 166/295 |
| 4,114,382 | 9/1978 | Kubens et al. | 405/264 |
| 4,139,676 | 2/1979 | Janssen et al. | 166/295 |
| 4,709,002 | 11/1987 | Younes | 528/53 |
| 4,731,427 | 3/1988 | Younes | 528/53 |
| 4,785,884 | 11/1988 | Armbruster | 166/280 |

Primary Examiner—George A. Suchfield
Attorney, Agent, or Firm—James C. Fails; Arthur F. Zobal; Geoffrey A. Mantooth

[57] ABSTRACT

A composition and method for consolidating proppant or gravel for propping fractures about, or for gravel packs for sand control in, wells in subterranean formations characterized by an improvement in which there is used a urethane quasi prepolymer consisting of dipropylene glycol and excess polymeric methylene diphenylene diisocyanate in a diluent, allowing to stand to form oligomers of polyurethane chains and admixing the urethane quasi prepolymer and diluent with a proppant and oil-based frac fluid and admixing a catalyst with the admixture of proppant and prepolymer and allowing to stand in the fractures, or well, until consolidation occurs. Also disclosed are specific examples of satisfactory frac fluids, diluents and catalysts and appropriate procedures for consolidation in one- or two-passes.

17 Claims, No Drawings

CONSOLIDATION OF HYDRAULIC FRACTURES EMPLOYING A POLYURETHANE RESIN

CROSS-REFERENCES TO RELATED APPLICATIONS

This application is a continuation-in-part application of U.S. Ser. No. 304,314, filed Jan. 31, 1989, same inventor, same title and same assignee, now abandoned in favor of this application.

FIELD OF THE INVENTION

This invention relates to consolidation of proppants in fractures about a well penetrating subterranean formations. More particularly, this invention relates to consolidating coated proppants that are injected into fractures in the subterranean formations under conditions such that the proppants will set up, or cure to consolidate and remain in place and resist crushing, closing of the fracture or being flowed back into the wellbore.

BACKGROUND OF THE INVENTION

The prior art has seen a wide variety of different approaches to consolidating proppants injected into fractures.

Hydraulic fracturing of a formation adjacent a borehole increases productivity of desirable hydrocarbonaceous fluids from the subterranean formation by creating channels of high fluid conductivity. In fracturing of formations, two major difficulties have been encountered. The first of these is proppant flowback. This decreases the amount of proppant holding the fractures open, allowing closing of the fractures and causing reduced permeability. The second problem is sand production from the subterranean formation. The produced sand tends to lower productivity, also.

Resin-coated proppants which have the ability to consolidate downhole have the potential to minimize both problems. Most of the commercial resin-coated proppants systems in use today are heat cured and are therefore consolidateable at higher temperatures and pressures found in deep wells.

This leaves a crying need for consolidation of proppants about low temperature wells such as those found in Alaska.

It is desirable to have a relatively high strength so as to resist crushing of the proppant when consolidated. In this way, the proppant is retained in the formation, is not produced back into the borehole or the like. Resin-coated proppants consolidated downhole have been used to offset this problem.

Any resin-coated proppant should be compatible with the fracturing fluids used to carry it downhole and be as economical as possible. Moreover, extra steps should be curtailed when feasible and eliminated where possible, as will be discussed in more detail hereinafter.

The prior art has ranged from U.S. Pat. No. 3,851,479 showing sealed porous earth formations where the void spaces are reduced with the treatment with aqueous solutions containing hydroxyl ions, polyisocyanurates, and polyvinyl alcohol, through U.S. Pat. No. 4,114,382 concerned with consolidating geological formations with a polyol and a special 1,2 alkylene oxide, to recent patents; such as U.S. Pat. No. 4,719,002 describing a method for preparing a molded reaction injection rigid non-cellular polyisocyanurate and U.S. Pat. No. 4,731,427 describing a method of preparing a molded reaction injection rigid polyurethane modified isocyanurate polymer composition. While these patents are pertinent chemically in that the reactants initially are quite similar, the result is vastly different from the invention herein.

It is desirable that any method of coating a proppant to provide downhole consolidation have the following features not heretofore provided:

1. A problem encountered during experimentation to try to solve the problem of consolidating a resin-coated proppant has been that the shearing of the resin-coated proppant causes the resin to come off the proppant and results in little or no consolidation;

2. Another problem has been that, when simulating shearing action that the coated proppant will undergo before or during pumping downhole, the turbulent motion should not cause premature polymerization of the resin. Expressed otherwise, polymerization should not be occurring at this time. It is desirable that a reduced degree of reactivity of any coating be achieved so it does not come off the proppant when admixed with the carrier;

3. It is desirable that the system for consolidating proppant be applicable to either a one step method in which a catalyst is admixed with the admixture of diluent, prepolymer, and proppant or a two step method in which the sand that is coated with the prepolymer and diluent, can be injected and then a catalyst overflushed, or flushed as a minor proportion of a carrier liquid. It is also desirable that the coated proppant have properties set forth in a co-pending application Ser. No. 304,325, now U.S. Pat. No. 4,920,192, filed the same date by Robin Wiser-Halladay as inventor and entitled "A POLYURETHANE QUASI PREPOLYMER FOR PROPPANT CONSOLIDATION". The descriptive matter of that application is incorporated herein in abbreviated form so that the reader will not have to advert to that application; but, in any event, is incorporated herein by reference for any details that may have inadvertently been omitted herefrom.

It is apparent that the prior art has failed to provide the above delineated features, as well as provide a proppant that has been resin-coated and that will cure by what has been abbreviated as a one pass procedure or two pass procedure, and that can be cured in low temperature wells.

SUMMARY OF THE INVENTION

Accordingly, it is an object of this invention to provide a resin-coated proppant that can be cured in low temperature wells to set and provide a consolidated proppant-packed fracture, simultaneously supplying the features delineated hereinbefore as being desirable and not heretofore provided.

Specifically, it is an object of this invention to provide a resin-coated proppant that can be cured at low temperature by either the one-pass method or the two pass method and that can have substantially all of the features delineated as being desirable hereinbefore and not hereto fore provided.

These and other objects will become apparent from the descriptive matter hereinafter.

In accordance with this invention there is provided a method of consolidating a proppant in a fracture about a well penetrating subterranean formation by an improved method which employs a resin system of polyurethane quasi prepolymer, and diluent containing oligomers of polyurethane linkages; admixing the resin system with the proppant; introducing the total mixture into fractures in the subterranean formation to consolidate the proppant in situ, either by heat and/or with a chemical catalyst. The polyurethane quasi prepolymer preferably is formed by reacting in intimate admixture a diol such as dipropylene glycol and a stoichiometric excess of methylene diphenylene diiosocyanate along with a diluent and allowing the reactants to stand in intimate admixture for a period of time sufficient to form the oligomers containing the polyurethane linkages. As an example, we have found that if the reactants are allowed to stand at a period of time exceeding two hours, preferably at a temperature of at least 25 degrees Centigrade (77 degrees Fahrenheit), satisfactory oligomers are formed.

Details of the total system that has been invented and its performance will be explained in more nearly complete manner hereinafter. It is important to note that the system uses commercial isocyanate resin in the form of a urethane quasi prepolymer. The advantages of using the resin in the form of a prepolymer were explained in the co-pending application entitled "A POLYURETHANE QUASI PREPOLYMER FOR PROPPANT CONSOLIDATION," referenced hereinbefore.

Specifically, the prepolymer is capable of consolidating the proppant at temperatures as low as 60 degrees Fahrenheit and this sets it apart from present day commercial systems. Specifically, none of the present day (nonaqueous) commercial systems could be successfully employed in low temperature wells.

A number of catalysts, including tertiary amines and organometallics have been shown to achieve consolidation. Additionally, this resin system has been demonstrated to have the desired chemistry to effect consolidated proppants in the presence of a hydrocarbon based frac fluid as well as the in situ hydrocarbons that we have tested. It is anticipated that a hydrocarbon fracturing fluid will be employed in the development of these low temperature formations because the resin is not compatible with aqueous fluids; because of the water sensitive nature of various formations and because sub-zero ambient temperatures cause freezing problems when water, or aqueous solutions, are employed.

The resin system developed and tested in this invention has been found to possess all of the desired characteristics for potential use in the oilfield. It is consistent with both the one-pass and two-pass procedures. The resin can be coated onto the proppant and then pumped downhole in a slurry with the fracturing fluid. The fracturing fluid can be lease crude or more preferably refined extract oil such commercially available as Nuso-250, from Exxon or Tufflo-491 from ARCO. The Nuso-250 and Tufflo-491 are trademarked oils. The Nuso-250 and Tufflo-491 are known as extract oils and are formed by approximately the same procedure. The Tufflo-491 is produced by heating crude up to 760-780 degrees F. The bottoms which do not distill off are mixed with N,N-dimethylpyrrolidone (N,N-DMP). The aromatics dissolve into the solvent. The solvent and the aromatic substituents in it are collected and the N,N-DMP is removed by heating to 550-600 degrees F. The aromatic portion left over is what is called the extract oil. In order to obtain the desired viscosity, two different starting crudes with differing viscosities are used in this process. The extracts from each are blended into a ratio such that the heavier crude extract will make up 60% of the total product. These fluids are well known and do not require extensive description hereinafter. They have a neutralization number less than 1.5 milligrams potassium hydroxide per gram of oil (mg.KOH/g) and viscosities in the range of 2,000-10,000 centipoises (cp) at room temperature. These refined extract oils represent much more economical fluids for fracturing low temperature wells in the lower 48 than other refined hydrocarbons.

When simple distilled oils are employed as the fracturing fluid, or carrier, the distillates from the North Slope crude can be employed, and the most desirable cut would be the 750-950 degree F. fraction. A 750 to 1030 cut could also be used, but due to the increased degree of polar species in the cut, the strengths of the consolidated pack will be decreased.

Table I gives viscosity data at 25° F. for the respective distillate fractions.

TABLE I

| Viscosity Data @ 25° F. | |
|---|---|
| Distillate Fraction | Viscosity (cp) |
| 750-850° F. | 150 |
| 850-950° F. | 3,500 |
| 850-950° F., with 10% diesel | 400 |
| 950-1030° F. | 40,000 |
| 950-1030° F. with 10% diesel | 1,900 |
| 1:1 combination of 750-850° F. and 850-950° F. | 400 |

When the extract or distilled oils are used, the resin can be directly added to the fracturing fluid and will coat the proppant in their presence. Best results have been obtained in this manner. In the one-pass method, the catalyst can be pumped also, called "on the fly" with a proppant in the fluid slurry and a time-controlled cure results in good consolidation over a desirable period of time; for example, less than 24 hours. For the two-pass procedure, the catalyst is pumped in a second step as a minor constituent of a liquid carrier and employed as an overflush.

DESCRIPTION OF THE PREFERRED EMBODIMENTS

In hydraulically fracturing subterranean formations about a well, it is frequently necessary to send a coated proppant downhole in a carrier fluid that is viscous enough for good proppant transport into all areas of the fracture zone. Expressed otherwise, a viscous fluid is needed to carry the proppant into the fractures.

The proppant, as well as any coating or consolidating agent associated therewith, filling the fractures, must possess several characteristics if the flow of oil is not to be reduced. It must have greater permeability than the formation itself for ease of oil or gas flow toward the wellbore. The consolidated proppant must have sufficient strength to withstand the overburden pressure and the confining pressures in order to prop open the fracture. Finally, it must show resistance to degradation by the fluids with which it comes into contact.

In this invention, the proppant, such as sand, and consolidating agent have these characteristics. The resin employed herein is a quasi prepolymer that has a viscosity of more than 7000 centipoises (cp) and serves as a means for consolidating the proppant in situ after the proppant is emplaced in the fractures. The consolidating media is compatible with the chemical components, or frac fluids, as well as in situ hydrocarbonaceous fluids tested.

It is also desirable to eliminate the silanation which has been required for other systems heretofore. Moreover, the resins of the prior art have required temperatures in excess of 90 degrees Fahrenheit (° F.) to effect curing and subsequent consolidation. It is desirable to have a coated proppant that can be cured at temperatures below 90 degrees F. for application in low temperature wells. This invention provides both of these features. Also, this resin can be cured by flushing a catalyst downhole at the same time the resin and proppant are sent. This is quite an advantage.

In accordance with this invention, there is prepared a prepolymer by admixing in intimate contact a diol such as dipropylene glycol (DPG) and source of methylene diphenylene diisocyanate (MDI). A diluent is added to keep the viscosity low enough to be flowable and usable.

Low molecular weight polyols will not work in this invention since they form too much branching to be useful. Diols are satisfactory. Examples of workable and practical diols, are 1,4-butanediol, diethylene glycol, dipropylene glycol, and 2,5-hexanediol.

These chemicals are defined in Hackh's Chemical Dictionary, fourth edition, Grant, editor, McGraw-Hill Book Company, 1969; and do not require further detailed description herein. It is also sufficient to note that these chemical reactants are commercially available from suppliers of chemical products.

Methylene diphenylene diisocyanate is preferred because it is commercially available from respective sources as the following trademarked product Mondur MR from Mobay Corporation; Rubinate M from ICI; PAPI 135 available from Dow Chemical; and MI from BASF.

While these monomers can react in intimate admixture alone, it is preferable to employ diluent to keep the viscosity low enough to be flowable and hence keep the solution of the polymer usable. The diluent can be selected from the class consisting of polar aprotic solvents consisting of dimethyl formamide, propylene carbonate, dimethyl sulfoxide. Propylene carbonate is preferred because it has been tested with good results.

It is clear from the data that when no quasi prepolymer is formed, no satisfactory consolidation is effected (that is no set is experienced that will give appreciable strength).

The following theory is given as to why the prepolymer enables the method of consolidating a proppant in a fracture to work. Experimental data has shown that the prepolymer enables the consolidation to occur and build consolidation test strength regardless of whether or not the theory is correct.

In the system consolidation apparently occurs from the anionic polymerization of methylene diphenylene diisocyanate reacting with a diol to form the block copolymer polyurethane. When dipropylene glycol is used as the comonomer a linear polymer can be produced. The following polymer product represents a repeat unit, as shown by the reaction of Formula I.

$$OCN-C_6H_4-CH_2-C_6H_4-NCO + OH-C_3H_6-O-C_3H_6-OH \quad (I)$$

(MDI)          (Dipropylene Glycol)

$$POLY(-O-\underset{\underset{O}{\|}}{C}-NH-C_6H_4-CH_2-C_6H_4-NH-\underset{\underset{O}{\|}}{C}-O-C_3H_6-O-C_3H_6-)$$

Polyurethane chain present in the prepolymer.

During the curing reaction with a tertiary amine or organometallic catalyst, trimers are formed from the coming together of three molecules of MDI. This greatly increases the degree of branching due to the R groups on the molecule, as shown in Formula II hereinafter, representing diisocyanate molecules which can interact either with more MDI or which have already reacted with diol to form homopolymer trimers or copolymer linear chains respectively. In the prepolymer there are monomers of MDI and then there are polyurethane chains which are terminated by MDI molecules which have the reactive isocyanate group (—N=C=O)

Sweeney, F. Melvin, in "Introduction to Reaction Injecting Molding," 1979, pp. 34–35, reports that with water, there are formed both biuret linkages and allophanate linkages, as shown in Formula II.

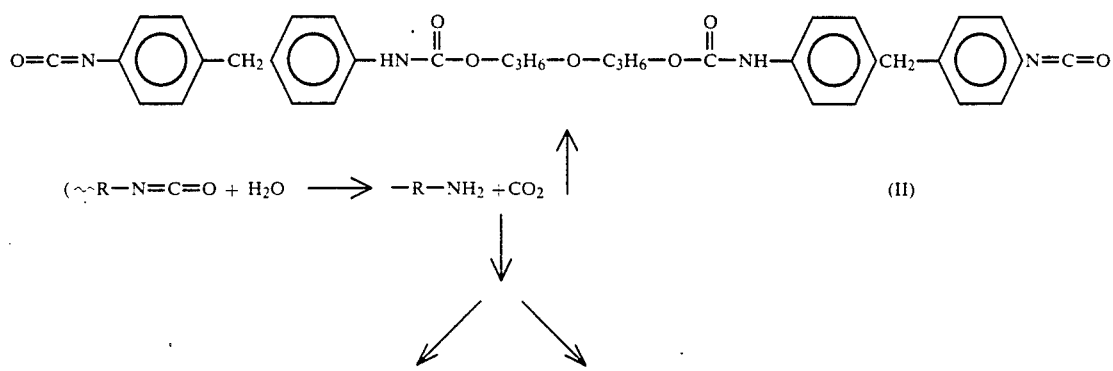

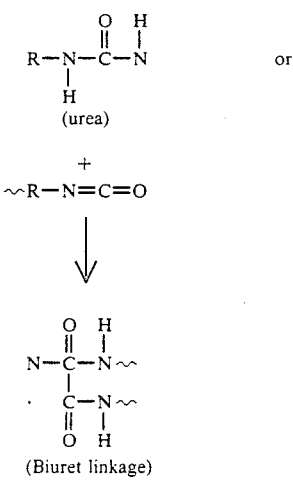

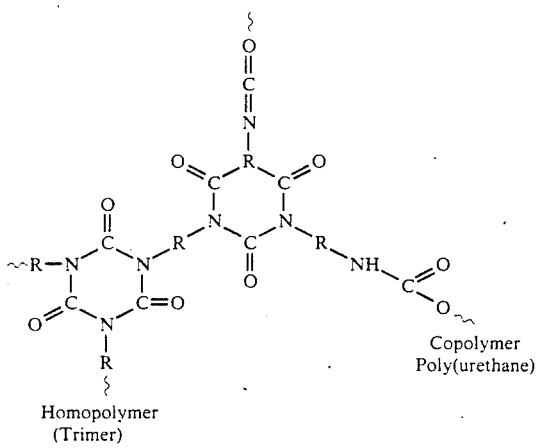

When employed with a tertiary amine catalyst, a type of structure formed by Formula III is produced in the catalyzed polymerization and consequent consolidation.

Three (3) isocyanates, or MDI molecules come together in forming the trimer.

The invention works. This is particularly true when the catalyst is admixed with the sand in the one-pass method before the sand is forced into the fractures in the formation.

The sand with the catalyst, prepolymer and diluent admixed therewith is then let set in place, or cured in situ, for a time sufficient for the consolidation to be effected. Specifically, it appears that the polyurethane chains may be formed before injecting and that the catalyst effects a polymerization between MDI molecules to form the consolidation.

Any of the usual methods that are employed in this art to put the sand in the formation may be employed herein, including other ways of admixing the catalyst with the sand diluent and quasi prepolymer.

In any event, it is known that the consolidation can be effected at temperatures below 100 degrees Fahrenheit; for example, 60–90 degrees Fahrenheit. The consolidation is effected without organo functional silane groups to form a chemical bridge and no silanation is necessary in this invention. This represents a distinctly different approach to the consolidation formerly effected with the reactants requiring at least relatively high temperature wells such as those having temperatures above 140 degrees Fahrenheit.

If crudes which contain no internal catalytic species are employed, it may be necessary to add slow-acting catalysts, such as water, if the one-pass procedure is employed. (some of the North Slope crudes catalyze the polymerization) This is particularly advantageous since better results are obtained with the one-pass process than in the two-pass process. The one-pass procedure is particularly desirable for fracturing long intervals with differing permeability zones.

The proportion of the liquid carrier and the sand is about 20 pounds of sand per gallon of liquid extract or distillate carrier or the like. This is then diluted even more with crude perhaps after the resin has coated the sand to bring it to the proper sand to fluid concentration for the operation.

The amount of prepolymer will be about 2–6 percent, preferably about 2–5 percent by weight of the sand. It is noteworthy that when 6 percent or more is employed there is a notable diminishing of the permeability of the consolidated proppant.

For the two-pass procedure, as indicated hereinbefore, the catalyst is pumped in as an overflush in a carrier liquid. The catalyst may be employed in only a small or very minor concentration as low as 2 percent or so. Preferably no more than 2 percent of the catalyst is employed even when it be a tertiary amine, metal alkyl or synergistic admixture thereof. Consolidation with these catalysts is achieved within minutes and the compressive strengths are sufficiently high to be considered satisfactory.

This procedure is particularly adapted and effective for gravel packing operations since most methods of consolidating gravel packs consist of two or more treatment passes. Only the immediate area around the wellbore would be consolidated.

Strengths of at least 400 psi are routinely obtained where proppant packs are allowed to consolidate for twenty-four hours. Over extended time it is to be expected that strengths in excess of 1000 psi would be obtained.

In the examples that we have tested, the fracture conductivity on consolidated packs will be at least 90 percent of the conductivity of the virgin sand and so are better than fracture conductivity measured on proppants in gelled hydrocarbon environments of the prior art.

Finally, long term stability tests in various environments have been performed and the polyurethanes which form this coating procedure proved to be very water repellent and showed sufficient chemical resistance to 2 percent potassium chloride solutions as well as Beaufort sea water. Acidization experiments show that strengths as high as 200 psi will be retained even after severe 24 hour exposure to harsh environments of flowing half strength mud acid such as 6.5 percent hydrochloric with 1.5 percent hydrofluoric acid passed through the consolidated proppants. This represents a significant achievement since no commercial resin-coated proppants have shown to be this resistant to attack by mud acid.

Table II shows characteristics of a system:

TABLE II

| | Characteristics of System | | | |
|---|---|---|---|---|
| Systems | Complexity | Gel | Cure Temp | Curing Times |
| 1A. Polyurethane | Two-pass | Oil-based e.g. DS YFGO IV (Dowell Schlumberger) | 60° F. and up | 4 hrs. |
| 1B. Polyurethane | One-pass | Oil-based lease crude | 60° F. and up | 24 hrs. |

Table III also shows properties of a system employing this invention:

TABLE III

| | Properties of System | | |
|---|---|---|---|
| Systems | Strength (PSI) | Fracture Conductivity Darcy-FT* | Stability to flowing crude |
| 1A. Polyurethane (two-pass) | 400 | 4.3/5.0 | Excellent |
| 1B. Polyurethane (one-pass) | 200–400 | 4.6 | Excellent |

*With 20–40 sand

The consolidated proppant in this invention has been found to have excellent stability to well acids [particularly well acids containing hydrochloric acid (HCl)] and to formation fluids such as crude and brine.

Details of Consolidation Procedure

The prepolymer is prepared before transportation to the well site.

Secondly, the water is premetered into the resid, or crude, sitting in large fracturing tanks, or another oil being used as the fracturing fluid. Specifically, it is proposed to use lease crudes extracts or distilled or refined oils having the proper viscosity to carry the proppant into the formation, either separately or during the fracturing operation.

It is possible to employ a crude that has tertiary amines in it and not have water in the fluid.

On the other hand, it is possible to employ a moisture cure which increases the set strength ordinarily obtained with the crude having as a minor constituent the tertiary amines which are employed as the catalyst.

The respective elements; such as, crude oil carrier like extracts or distilled or refined oil, diesel, sand, and prepolymer are pumped to a blender truck where the resin will be coated onto the sand to form a slurry.

Upon exiting the truck, the carrier containing water, if water is employed, will be added to the above-mentioned slurry to bring the proppant, such as sand, to the proper concentration for pumping downhole in the single pass system. Thereafter, the entire admixture is allowed to set, or cure and consolidate the proppant, such as sand in the fractures where it has been emplaced. This invention can be employed with any inert conventional proppants, such as synthetic proppants like the ceramics, or sand.

As a result, the proppant is held in the fractures and is not produced back into the wellbore. The proppant also operates to effect a holding in situ of sand that is normally in an unconsolidated formation and alleviates the problem of sand production back into the well. Expressed otherwise, the consolidated proppant solves the problems associated with propping open a fracture heretofore when production of the desired hydrocarbonaceous fluid is resumed.

If desired, the fracture fluid, which may be the above-delineated carriers, may also contain the catalyst. For example, any carrier may contain a minor amount of water if a moisture cure is to be employed. It contains a tertiary amine if the tertiary amine is employed as the catalyst alone. On the other hand, the same catalyst may be flushed over the admixture of the proppant and prepolymer solution, if desired. This latter process is referred to as a two-pass system and the overflush of the resid or fluid containing the catalyst allows the catalyst to effect a cure of the resin on the sand and effect sand consolidation if sand is employed as the proppant, even at low temperatures as low as 60 degrees F.

Expressed otherwise, the overall job scenario is simple and straightforward. The system may be used in Alaska where exceptionally low surface and bottom-hole temperatures are encountered. If desired, however, the system can be employed in the contiguous states of the continental United States, commonly referred to as the "lower 48 states." The system has been developed under laboratory conditions and tested simulating fracturing processes as much as possible. The system has been found to possess all the desired characteristics for potential use in the oil field and is consistent with both the one-pass and the two-pass procedures. The resin can be coated onto the proppant and pumped downhole in slurry with the fracturing fluid in the one-pass method.

It has been shown that the lease crude or other viscous crudes, may give sufficient proppant transport to serve as satisfactory fracturing fluids. Furthermore, components in some crudes have been shown to act as catalysts. These enable curing the resin and promoting consolidation and we theorize that these are tertiary amines, or other strong bases present as polar fractions of the crude. In addition, a small amount of water may be added.

EXAMPLES

The following examples illustrate employment of this invention.

EXAMPLE I

A stoichiometric excess of 4,4-methylene diphenylene diisocyanate (commercially know as MDI), was admixed with dipropylene glycol and allowed to sit at about 75 degrees Fahrenheit for 2-3 hours. This allowed the oligomers of the polyurethane chains to be formed, if such was the reason why the invention is successful. The quasi prepolymer that was formed is defined as a polymeric mixture when one monomer is in excess. In this case, the excess was the MDI. It is theorized and the invention works, whether this theory is correct or not, that the MDI is later converted to trimers after the admixture has been placed onto the sand and the tertiary amine or organo metallic catalyst added. The linear polyurethane chains formed by the reaction of the diol with the MDI have low energy of activation and can occur at room temperature. The reaction between the MDI molecules themselves; such as trimerization, may actually require a somewhat higher temperature but are able to be brought about in situ.

In any event, the properties of the monomers are such that they enable the quasi prepolymer to be used for proppant consolidation and fracturing operations. Without the use of the prepolymer, the resin has been shown to be easily scraped off at shearing rates analogous to those necessary to pump the proppant in gel slurries downhole. Consequently, no consolidation occurs without the use of the prepolymer. This has been demonstrated in several experiments.

In addition, the mere agitation from shearing causes premature reaction between any unreacted diol and MDI to speed up due to the low activation energy for this reaction causing a premature consolidation to occur between the sand particles. When the prepolymer is used, the premature consolidation does not occur since the diol has already been reacted before being added to the sand.

Good consolidation of the proppant was observed with sand as the proppant and employing the composition of this example, even in the presence of oil.

A variety of reactants ratios have been employed and it has been found that this invention will work from a ratio of 3 parts MDI to 1 part DPG to as much as 12 parts MDI to 1 part DPG, the proportions being on a weight percent basis.

It is theorized that since the alternating copolymer has already been formed between the MDI and the diol polymers before being admixed with the sand, a higher molecular weight species is formed that is more viscous and increases the wetting ability to stay attached to the sand during the shearing operation.

The MDI is less toxic than other aromatic isocyanates and will serve as best source for large scale fracturing operations. The dipropylene glycol is chosen based on the degree of branching that it would produce and subsequent compressive strengths obtained. It has been found to give the best strengths when compared to various other polyols and decreases the degree of tackiness that is produced during shearing or pumping operation, particularly when admixed with sand.

EXAMPLE II

In this example a proportion of 75 percent Nuso-250 and 25 percent diesel was employed with 6 grams of prepolymer. Table IV summarizes the results obtained with the consolidation strength given in pounds per square inch (psi).

TABLE IV

Experiments with Nuso-250

1. 33 g 75% nuso/25% diesel, 6 g 7/1 25% prepolymer 120 g sand, slurried; added 64 g North Slope Crude and sheared, 906 psi.
2. 40 g 75% Nuso/25% diesel, 6 g prepolymer, 120 g sand, slurried; and added 54 g unfiltered undiluted resid at 100 F. and sheared. 671 psi.
3. 30 g 75% Nuso/25% diesel, 6 g prepolymer, 120 g sand; added 64 g unheated unfiltered undiluted resid and sheared; cured 1 week, 597 psi.
4. 40 g 75% Nuso/25% diesel, 6 g prepolymer, 120 g sand, mised; added 54 g 140 F. undiluted resid with 2% $H_2O$; sheared, 474 psi.
5. same as #3, only added 100 F resid and cured one day, 465 psi.

Table V represents the results of the same proportion of Tufflo-491 75%with 25% diesel and 6 g of prepolymer in the same admixture as in the first experiment.

TABLE V

Experiments with Tufflo Oil 1. 40 g 75% Tufflo-491/25% diesel mixture, 6 g prepolymer, 120 g sand, mised, and then added 54 g undiluted resid containing 2 % $H_2O$; sheared; 382 psi.
2. same as above, only resid was heated to 120 F.; 294 psi.
3. same as above, only used filtered 120 F; North Slope oil with 0.5% $H_2O$, and cured for 3 days instead of 1; 653 psi.

EXAMPLE IV

In these examples, a variety of distillate cuts in the range from 750-1030 degrees F. of Kuparauk distillate cuts were employed. Table VI summarizes the results given.

TABLE VI

| Consolidation Data from Kuparauk Distillate Cuts | |
|---|---|
| Test Procedure | Comp. Strength |
| (5 wt % resin in oil added directly to 20/40 sand) | PSI |
| 1. 850-950° F. cut at 13 ppg concentration. | 221 |
| 2. Same as above; only the fluid was cut with 10% diesel | 942 |
| 3. Neat 750-850° F. cut using the same procedure | 977 |
| 4. 750-850° F. cut, at 9 ppg | 391 |
| 5. 1:1 mixture of 750-850° F. and 850-950° F. at 9 ppg | 318 |
| 6. 950-1030° F. cut diluted with 13% diesel at 9 ppg (880 cp) | 131 |

The prepolymer has been made compatible with systems such as the alkyl ortho-phosphate gelled diesel (DS YFGO IV) and also the lease crudes and extract oils when they are employed as fracturing fluids. The oils are viscous enough for proppant transport, give higher fracture conductivity, and are more economical than commercial gelling systems.

A catalyst is used that can be employed in the particular carrier, similarly as indicated. A resin has been formed that gave a compressive strength greater than 2000 pounds per square inch (psi) in the presence of gelled diesel and with gelled diesel or crude will give at least 400 pounds per square inch (psi) in consolidation tests. The standard ASTM 0695-85 was employed as a standardized test for the compressive strength testing. Conductivity values obtained with an API conductive cell are within 90 percent of those for consolidated virgin sand.

The resin and the prepolymer reactant solution has been found to be stable to all fluids that have been in contact with fractures, that is brine, oil and even half-strength mud acid.

From the foregoing it can be seen that this invention achieves the objects delineated hereinbefore.

Having thus described the invention, it will be understood that such description has been given by way of illustration and example and not by way of limitation, reference for the latter purpose being had to the appended claims.

What is claimed is:

1. In a method for consolidating proppant injected in a subterranean formation penetrated by a well from the earth's surface for producing to the earth's surface a desired hydrocarbonaceous fluid from the well, which involves the steps of:
    a. fracturing about the well penetrating into the subterranean formation to form fractures for increased production of the hydrocarbonaceous fluid;
    b. injecting a proppant in an oil-based fracturing fluid into said fractures for holding said fractures for increased production of said hydrocarbonaceous fluid; an
    c. injecting a consolidating fluid for consolidating said proppant downhole;
the improvement consisting essentially of
    d. providing in said consolidating fluid a mixture of quasi polyurethane prepolmer and diluent, obtained by reacting in intimate admixture in a diluent, a diol and in stoichiometric excess methylene diphenylene diisocyanate, and allowing the reactants to stand in intimate admixture sufficiently long to form oligomers containing polyurethane linkages; and
    e. admixing in situ said proppant, quasi prepolymer and diluent with a catalyst, and allowing to stand for a period of time sufficient to consolidate said proppant.

2. The method of claim 1 wherein said diluent is selected from the class consisting of dimethyl formamide, propylene carbonate and dimethyl sulfoxide.

3. The method of claim 2 wherein said catalyst of claim 1 is selected from the class consisting of tertiary amines and water in a very minor amount within a carrier liquid.

4. The method of claim 2 wherein said oil-based fracturing fluid is selected from the class consisting of a refined oil, lease crude, and resid.

5. The method of claim 2 wherein consolidation is effected at temperatures as low as 60 degrees Fahrenheit.

6. The method of claim 2 wherein a one-pass procedure is employed and the catalyst is admixed with the fracturing fluid before injection into the fractures.

7. The method of claim 2 wherein a two-pass procedure is employed and catalyst is overflushed in a separate fluid.

8. The method of claim 2 wherein said diluent is propylene carbonate.

9. The method of claim 1 wherein the proppant is selected from the group consisting of sand and synthetic proppant.

10. The method of claim 9 further comprising admixing from 95-98 parts by weight of proppant and from 2-5 parts by weight of the resin, which includes the prepolymer plus diluent, and adding the catalyst.

11. The method of claim 1 wherein a carrier fluid is employed in both the fracturing and injecting the proppant as well as injecting a mixture of quasi prepolymer in diluent and wherein the carrier fluid is selected from class consisting of an extract oil formed by extracting conventional oil with N,N-dimethylpyrrolidone and a crude distillate from crude oil from the North Slope, with the distillate boiling point range being in the range of 750 degrees-950 degrees F. for optimal strength.

12. The method of claim 11 wherein said carrier fluid is said extract oil.

13. The method of claim 11 wherein said carrier fluid is said crude distillate.

14. In a method for consolidating gravel in a well which includes:
    a. emplacing gravel in the wellbore; and
    b. injecting a consolidating fluid and flushing to consolidate the gravel,
the improvement consisting essentially of:
    c. providing in the consolidating fluid a quasi prepolymer formed by reacting in intimate admixture in a diluent, a diol and in stoichiometric excess methylene diphenylene diisocyanate and allowing the reactants to stand in intimate admixture to form oligomers of polyurethane chains; and
    d. admixing with said gravel, quasi prepolymer and diluent, a catalyst and allowing to stand for a period of time sufficient to consolidate said gravel.

15. The method of claim 14 wherein a carrier fluid is employed in steps c. and d. and said carrier fluid is selected from class consisting of an extract oil formed by extracting conventional oil with N,N-dimethylpyrrolidone and a crude distillate from crude oil from the North Slope, with the distallate boiling point range being in the range of 750 degrees-1030 degrees F.

16. The method of claim 15 wherein said carrier fluid is said extract oil.

17. The method of claim 15 wherein said carrier fluid is said crude distillate.

* * * * *